Oct. 5, 1954

G. L. WEISER ET AL 2,690,773

WIRE TWISTING AND FUSING MACHINE

Filed Oct. 29, 1949

Inventors
George L. Weiser
and
Willard L. Shaw
by Spencer Hardman Fehr
their attorneys Oct. 5, 1954

G. L. WEISER ET AL 2,690,773

WIRE TWISTING AND FUSING MACHINE

Filed Oct. 29, 1949

Inventors
George L. Weiser
and Willard C. Shaw
by Spencer Hardman & Fehr
their attorneys

Oct. 5, 1954  G. L. WEISER ET AL  2,690,773
WIRE TWISTING AND FUSING MACHINE
Filed Oct. 29, 1949  8 Sheets-Sheet 3

Inventors
George L. Weiser
and
Willard C. Shaw
by Spencer Hardman & Fehr
their attorneys Oct. 5, 1954  G. L. WEISER ET AL  2,690,773
WIRE TWISTING AND FUSING MACHINE
Filed Oct. 29, 1949  8 Sheets-Sheet 5

Fig. 9.

Inventors
George L. Weiser
and
Willard C. Shaw
by
Spencer Hardman & Fehr
their attorneys Oct. 5, 1954 — G. L. WEISER ET AL — 2,690,773
WIRE TWISTING AND FUSING MACHINE
Filed Oct. 29, 1949 — 8 Sheets-Sheet 6

Inventors
George L. Weiser and
Willard C. Shaw
by Spencer Hardman & Fehr
their attorneys Patented Oct. 5, 1954

2,690,773

UNITED STATES PATENT OFFICE 2,690,773

WIRE TWISTING AND FUSING MACHINE

George L. Weiser and Willard C. Shaw, Anderson, Ind., assignors to General Motors Corporation, Detroit, Mich., a corporation of Delaware Application October 29, 1949, Serial No. 124,296

9 Claims. (Cl. 140—2)

This invention relates to the art of connecting lead wires of electrical coils which are assembled in pairs before being assembled with apparatus of which the coils are a part. Such coils may be, for example, the field coils of a generator.

An object of the invention is to provide a machine for twisting together lead wires extending from two electric coils, for fusing the twisted leads, and for bending the fused leads so that they are out of the way of subsequent handling of the coil assembly. To accomplish this object, the machine includes a continuously moving conveyor which moves coil holders arranged in pairs and which moves lead wire holders each located intermediate a pair of coil holders, a carriage which supports a lead twister, a lead fuser, and a lead bender which are spaced according to the spacing of the lead wire holders and means for causing the conveyor to move the carriage with it for a certain distance, for example, about one-half the spacing of lead wire holders. When the carriage is in starting position, three lead wire holders are simultaneously located respectively adjacent to the twister, the fuser and the bender. During movement of the carriage with the conveyor, leads in the holder adjacent the twister are twisted and leads in the holder adjacent the fuser are fused and leads in the holder adjacent the bender move with the bender. After the carriage has moved with the conveyor said certain distance, it is released automatically and returns to starting position while the conveyor continues to move ahead and bring untwisted leads to the twister, previous twisted leads to the fuser and previously fused leads to the bender, while the previously bent fused leads move toward a place where the coil assembly is unloaded.

A further object of the invention is to provide for cutting off excess wire of the unjoined leads of the coils. To accomplish this, the machine provides other lead wire holders moved by the conveyor and each providing a shear blade which is automatically advanced to cut the lead wire as the conveyor moves.

Further objects and advantages of the present invention will be apparent from the following description, reference being had to the accompanying drawings, wherein a preferred embodiment of the present invention is clearly shown.

In the drawings:

Figs. 26 through 28 are three fragmentary diagrammatic views showing progressively, operations on a pair of coil leads wherein Fig. 26 shows the leads at the twisting position; Fig. 27 shows the same leads progressed to a fusing position; and, Fig. 28 shows the same leads progressed to the bending position.

Figure 1:
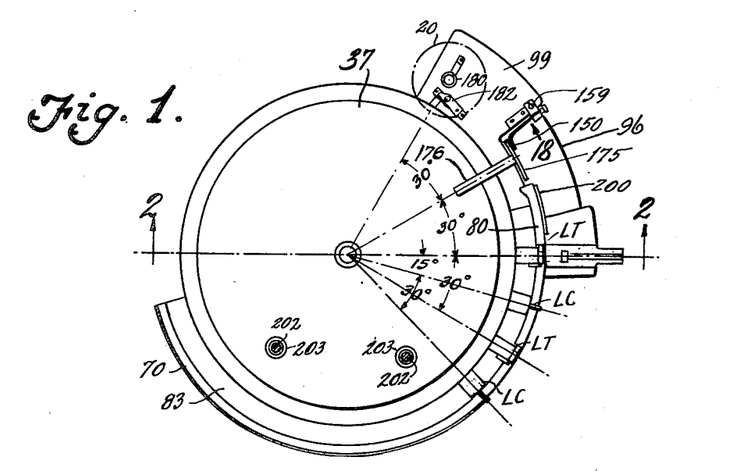
Fig. 1 is a diagrammatic plan view of the machine.
Figure 2:
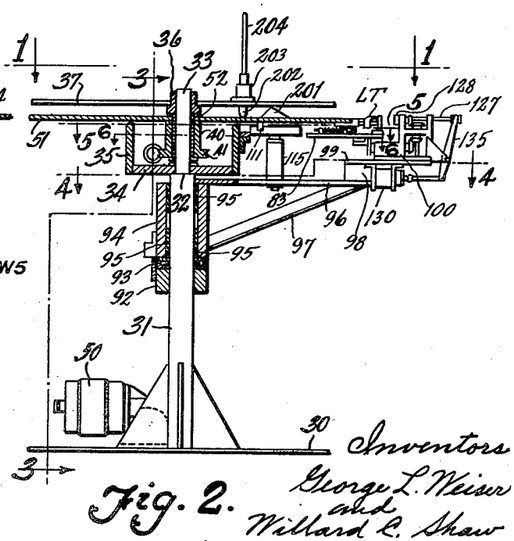
Fig. 2 is a sectional view on line 2—2 of Fig. 1.
Figure 3:
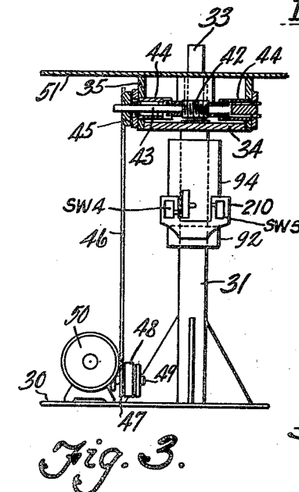
Fig. 3 is a sectional view on line 3—3 of Fig. 2.
Figure 9:
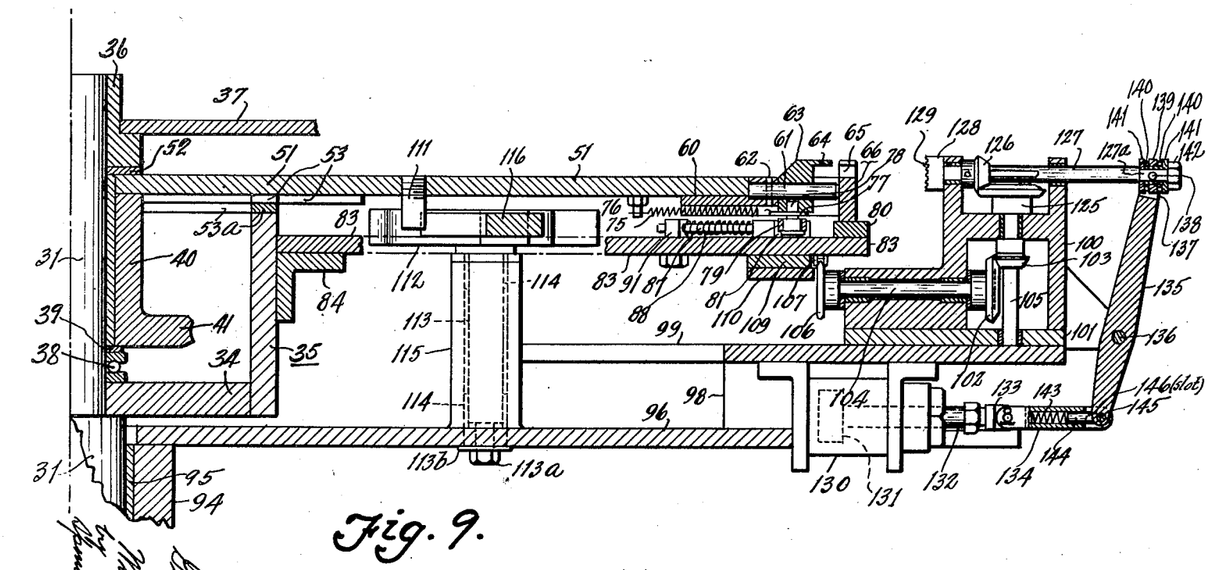
Fig. 9 is a fragmentary, sectional view on line 9—9 of Fig. 7.
Figure 10:
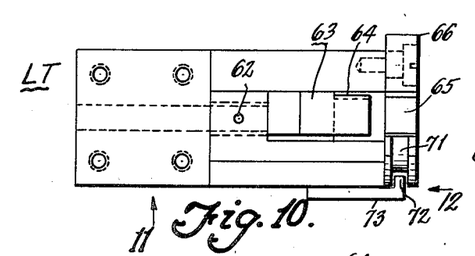
Fig. 10 is a plan view of one of the holders for supporting the lead wires to be twisted.
Figures 11, 14:
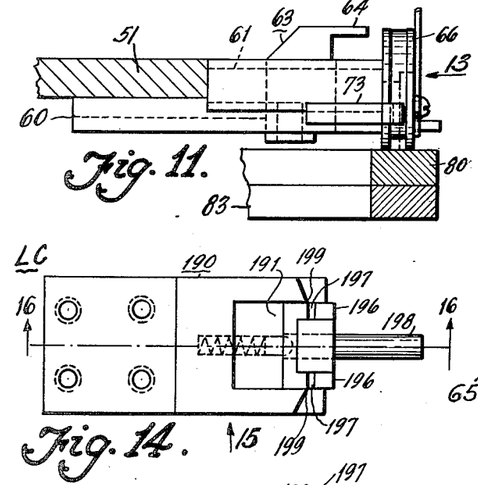
Fig. 11 is a view in the direction of arrow 11 of Fig. 10 with a fragment of dial 51 in section.
Fig. 14 is a plan view of a holder which receives lead wires to be cut in order to remove excess wire.
Figure 12:
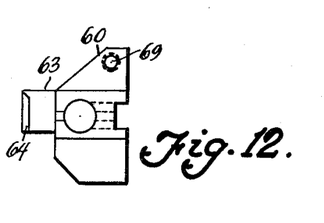
Fig. 12 is a view in the direction of arrow 12 of part 63 shown in Fig. 10.

Referring to Figs. 1 to 3, a base plate 30 secured to the floor supports a pedestal 31 having a shoulder 32 from which there extends a reduced portion 33, which extends through the bottom wall 34 of a gear case 35 and which is attached to a bushing 36 supporting a fixed plate 37. As shown also in Fig. 9, wall 34 supports thrust ball bearing 38 which in turn supports a washer 39 supporting the hub 40 of a worm gear 41 meshing with a worm 42 attached to a shaft 43 journaled in ball bearings provided by bearing housings 44 attached to the case 35. Shaft 43 is connected with a sprocket 45 (Fig. 3) connected by chain 46 with a sprocket 47 connected by a torque-limiting clutch 48 with a shaft 49 driven by an electric motor 50 through a speed reducing mechanism.

The hub 40 of gear 41 is connected with a circular plate or dial 51 spaced from bushing 36 by a washer 52 and spaced from the case 35 by a plate 53 connected with a conveyor or dial 51, said plate 53 being supported upon bearing members 53a attached to the upper edges of the side walls of the case 35.

Figures 7, 7A, 8:
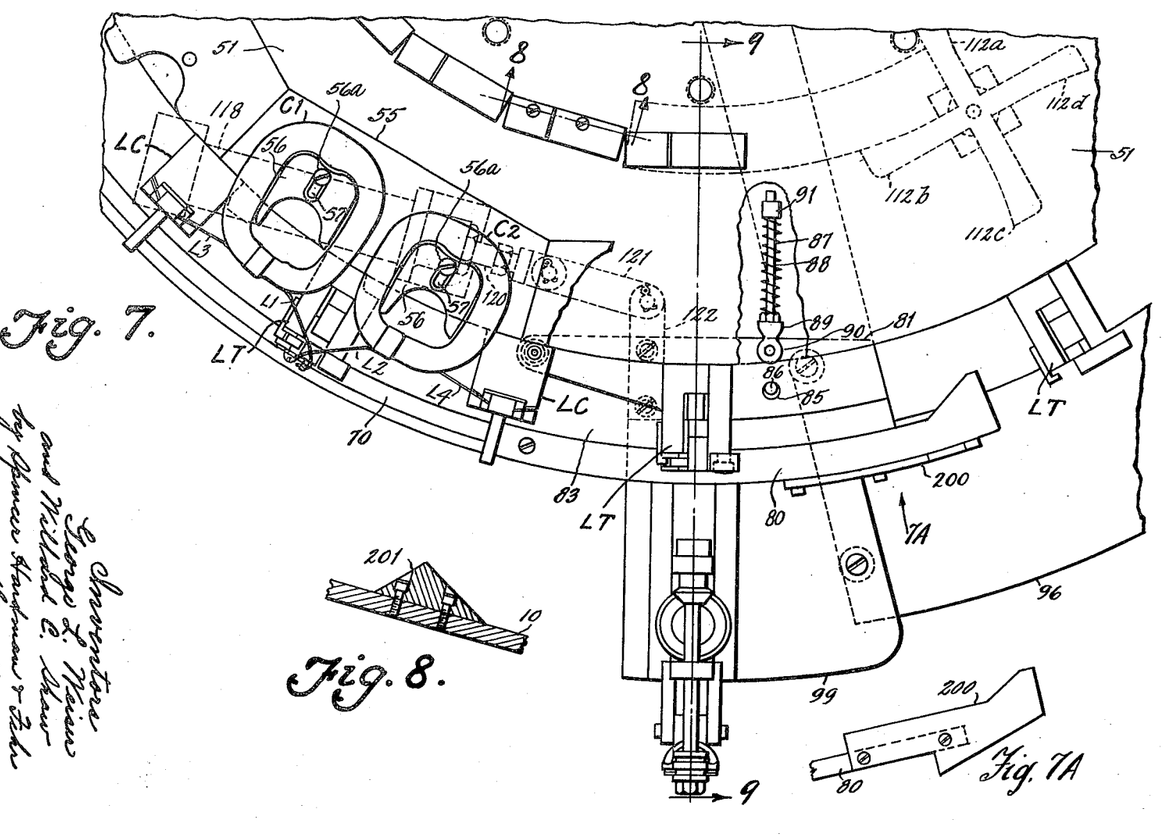
Fig. 7 is a fragmentary, plan view of the machine and is drawn to a much larger scale than the preceding views.
Fig. 7A is a view of a cam 200 looking in the direction of arrow 7A of Fig. 7.
Fig. 8 is a sectional view on line 8—8 of Fig. 7.

A plurality of plates 55 (Fig. 7) are attached to the upper side of dial 51 near the periphery thereof. Each plate 55 receives two screws 55a passing through slots 57 in plates 56 which provide for the location of a pair of coils C1 and C2 whose adjacent lead wires L1 and L2 are to be twisted together and fused and whose other lead wires L3 and L4 are to be cut. As shown, the leads L1 and L2 are located upon a holder LT where the leads are twisted together. Leads L3 and L4 are located upon holders LC where these leads are to be cut to the proper length.

Figure 5:
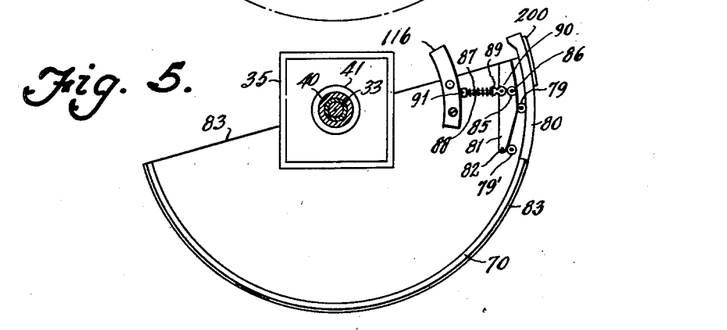
Figure 13:
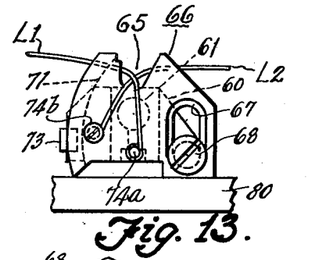
Fig. 13 is a view in the direction of arrow 13 of Fig. 11.

Referring to Figs. 10–13A showing details of holder LT, this holder comprises a bracket 60 attached to the underside of dial 51 and supports a rod 61 (Fig. 9) attached to bracket 60 by pin 62. The rod 61 supports for horizontal sliding movement a block 63 having a lug 64 adapted, when moved to the right in Fig. 9 to be received by a notch 65 in a plate 66 having counterbore slot 67 receiving the head of a screw 68 threaded into a tapped hole 69 (Fig. 12) in block 63. When plate 66 is in functioning position, it is supported by a rail 70 (Figs. 5 and 7) or by a plate 80 extending therefrom. When not thus supported, plate 66 drops to the position 66a (Fig. 13A) so as to be out of the way for the operation of fusing the twisted wires. Counterclockwise movement of dial 51 carries the plate 66 to the left end of rail 70 which tilts the plate 66 as indicated at 66b (Fig. 13A) and causes its return to functioning position. Plate 66 has a groove 71 receiving a lug 72 of a bar 73 attached to block 63. While the block 63 is spaced from the plate 66, the lead wires L1 and L2 of adjacent coils C1 and C2 are pulled into the notch 65 of plate 66 and are bent respectively around a pin 74a and screw 74b attached to plate 66 which is then supported, as shown in Fig. 13, by the rail 70. Block 63 is urged away from plate 66 by a spring 75 (Fig. 9) attached to a stud 76 supported by dial 51 and to a washer 77 attached to block 63 by a stud 78 which carries a roller 79 which is received between the plates 80 and 81 supported by a plate 83 which supports rail 70. Plate 83 is attached to a bracket 84 (Fig. 9) attached to side walls of the case 35. Plate 81 is pivoted at 82 upon plate 83 and has a hole 85 for receiving a smaller sized pin 86 attached to plate 83. Plate 81 is urged clockwise (Fig. 5) so that the left side of pin 86 is engaged by the surface defining the hole 85 by a spring 87 which surrounds a rod 88 (Fig. 7) attached to a clevis 89 having a cylindrical head 90 received by a recess in plate 81. Rod 88 extends through a lug 91 attached to plate 83. As the dial rotates counterclockwise, each roller 79, associated with a workholder LT, is caused to move radially outward (as from 79' to 79 in Fig. 5) so that the lug 64 will move into a notch 65 of plate 66 and thus retain the lead wires to be twisted while located within that notch.

Figure 6:
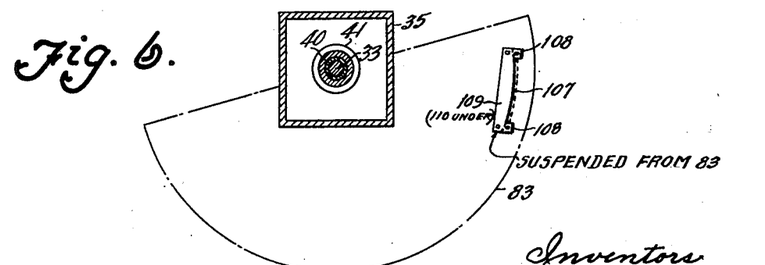

Since the dial 51 is moving continuously, it is necessary that the lead twisting mechanism be caused to move with the work during a portion of its movement. For this purpose, the post 31 (Fig. 2) provides a collar 92 which supports a thrust ball bearing 93 which supports a hub 94 having bearing bushings 95 journaled on the post 31. Hub 94 supports a plate 96 braced to the hub by bars 97. Plate 96 supports spacers 98 (Fig. 9) which support a plate 99 which supports a frame 100 and an intermediate plate 101 providing a cover enclosing gears 102 and 103 connected, respectively, with shafts 104 and 105 journaled in bearings provided by the frame 100 and plate 101. Shaft 104 is connected with a sprocket 106 adapted to mesh with an arcuate rack provided by a strip of sprocket chain 107 which, as shown in Fig. 6, is attached to ears 108 provided by a plate 109 (Fig. 9) attached to plate 83 and spaced therefrom by plate 110.

Plate 51 carries pins 111 (Fig. 9) equal in number to the number of holders LT. Each pin engages one of four arms 112a, 112b, 112c, 112d (Fig. 4) radiating from and attached to a shaft 113 (Fig. 9) journaled in bearings 114 fixed to a post 115 attached to plate 96. Shaft 113 is retained by a screw 113a passing through a washer 113b and plate 96. As the pin 111 moves counterclockwise, it urges an arm such as 112a which engages it in a clockwise direction about the axis of shaft 113, but such movement cannot take place then because there is another arm 112b which engages a plate 116 which is attached to the fixed plate 83. Therefore the plate 99, attached to plate 96, moves with the dial 51 until the arm marked 112b clears the plate 116 and then plate 96 is released from the dial 51 and is caused to return to starting position by means to be described. During return movement of plate 96, pin 111 turns arms 112a clockwise sufficiently to free it from pin 111, arm 112b, by virtue of engagement with plate 116, moves into the position formerly occupied by arm 112a and arm 112c moves into the position formerly occupied by arm 112b and arm 112d into the position formerly occupied by arm 112c. The plate 96, on being freed from connection with dial 51, is returned to starting position through the action of a spring 117 located within a dash-pot cylinder 118 attached to the fixed plate 83 and urging downwardly, as viewed in Fig. 4, a piston 119 connected by a rod 120 and a link 121 with a plate 122 attached to plate 99. Plate 99 stops in normal position by engagement of arm 112b, then in the position formerly occupied by arm 112a with the plate 116 which then receives arm 112c then in the position formerly occupied by arm 112b.

During movement of plate 99 with the dial 51, sprocket 106 (Fig. 9) rolls on the chain 107 and effects rotation of shafts 104 and 105. Shaft 105 rotates a gear 125 meshing with a gear 126 having a longitudinal spline connection with a shaft 127 journaled in bearings provided by the frame 100 and connected with a twister 128 having a serrated annular flange 129 which, when moved toward the left, engages those portions of wires which are in front of the plate 66 and bent around pin 74a and screw 74b and which causes these wires to be twisted together at the time when block 63 is being moved to the right from the position shown in Fig. 9. During twisting, the lug 64 of block 65 confines the lead wires within the notch 65 of plate 66 and right movement of the block 63 pushes the wires toward the twister 128. The lead twisting operation causes the lead wires L1 and L2 to be pulled from pin 74a and screw 75b respectively (Fig. 13).

Figure 4:
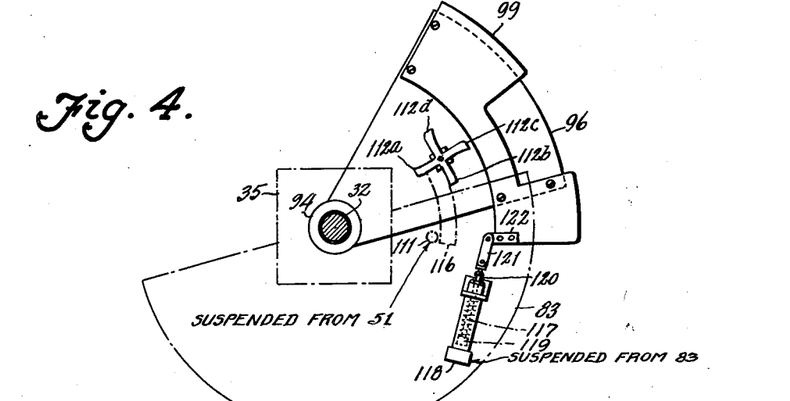
Figs. 4, 5 and 6 are sectional views taken, respectively, on lines 4—4, 5—5 and 6—6 of Fig. 2.

Twister 128 is caused to move left (Fig. 9) by a mechanism which includes a fluid pressure cylinder 130 attached to plate 99 and receiving a piston 131 connected by a rod 132, a clevis 133 and a link 134 with a lever 135 pivoted at 136 on frame 100 and having arms 137 connected to a disc 138 located between thrust bearings 140 surrounding the reduced portion 127a of shaft 127 and located between washers 141, all of these parts being retained by a nut 142 threadedly connected with the reduced portion 127a of shaft 127. The pressure which the twister 128 applied to the wires is made yielding by virtue of a spring 143 received by the link 134 and urging to the right a pin 144 bearing against the lever 135 and forcing a pin 145 attached to said lever toward the right end of slots 146 provided by the forked end of link 134. Pressure fluid is caused to flow into the left end of cylinder 130 in order to cause right movement of piston 132 and left movement of shaft 127 just as movement of plate 99 and the twister 128 with the dial 51 begins. Therefore the twisting operation is performed while the twister supporting carriage provided by plates 98 and 99 moves a distance equal to about one-half the angular spacing of the lead wire holders LT, for example, about 15°. Then, at the end of this movement, pressure fluid is admitted to the right end of cylinder 130 so as to retract the twister 128 so that it will be released from engagement with the wires during return of plate 99 by the spring 117 in the dash-pot cylinder 118 (Fig. 4).

Figure 13A:
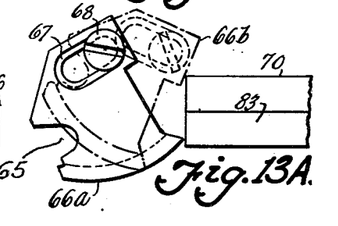
Fig. 13A is a view similar to Fig. 13, showing part 66 in other positions.
Figures 18, 19:
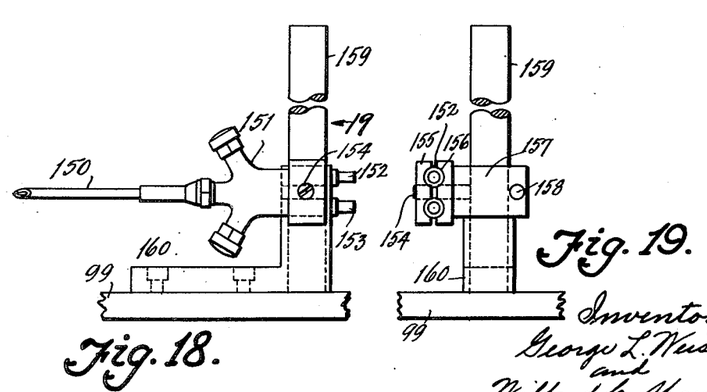
Fig. 18 is a view in the direction of arrow 18 of Fig. 1 and shows, on a larger scale, the wire fusing burner and its support.
Fig. 19 is a view in the direction of arrow 19 of Fig. 18.

After the twisting operation, block 63 is retracted and plate 66 moves away from plate 89 and drops to position 66a (Fig. 13A). The dial carries the workholders LT successively toward a hot flame issuing from a burner pipe 150 (Fig. 1) which, as shown in Fig. 18, extends from a fitting 151 having pipes 152 and 153 connected, respectively, with sources of oxygen and acetylene not shown. Fitting 151 is clamped by a screw 154 between plates 155 and 156 supported by a clamp 157 which a screw 158 secures to a post 159 in a desired position of vertical adjustment. Post 159 is attached to a bracket 160 supported by the carriage plate 99. The burner pipe 150 moves with the twister while moving with the dial 51 counterclockwise. When a workholder LT has arrived at a position in alignment with a bracket 170 fixed to plate 37 and supporting a heat resisting baffle plate 175, by means to be described, gas burning at the end of pipe 150 produces heat sufficient to fuse the twisted wires while the burner moves with them counterclockwise for about 15°.

Figures 20, 21, 22, 23:
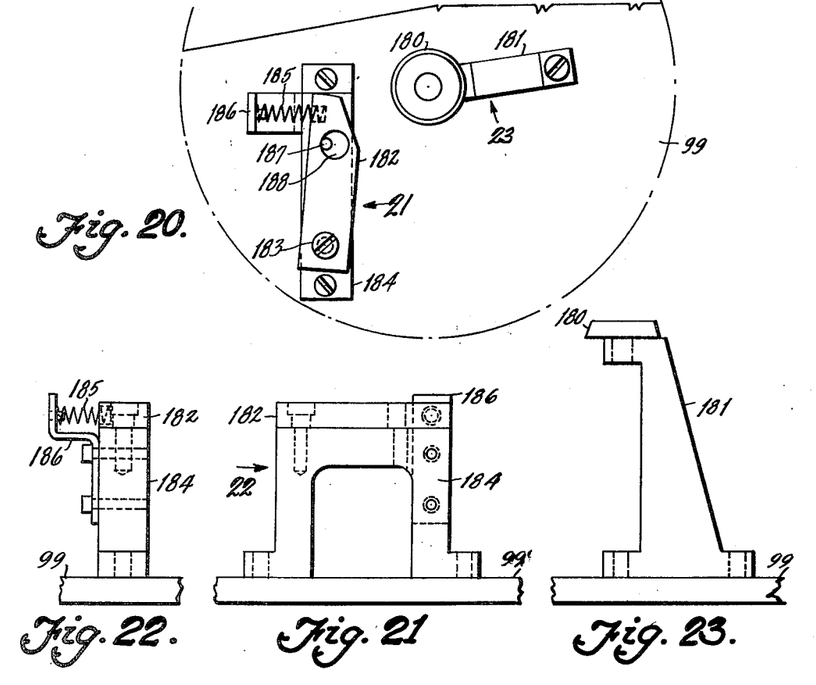
Fig. 20 is an enlargement of that portion of Fig. 1 within the circle 20.
Fig. 21 is a view in the direction of arrow 21 of Fig. 20.
Fig. 22 is a view in the direction of arrow 22 of Fig. 21.
Fig. 23 is a view in the direction of arrow 23 of Fig. 20.

The fusion of the wires results in a bead which projects outwardly. In order that this bead be bent downwardly, it is caused to be forced against a roller 180 (Figs. 1 and 20) supported by a bracket 181 attached to plate 99. In order to effect movement of the work toward the roller 180, the block 63 (Fig. 9) is caused to move outwardly again due to engagement of roller 79 with a lever 182 (Fig. 20) pivoted on a screw 183 supported by a bracket 184 attached to plate 99. A spring 185 confined between a bracket 186 attached to bracket 184 and lever 182 urges said lever clockwise until the lever engages a pin 187 extending from bracket 184 into a hole 188 provided by the lever.

Figure 15:
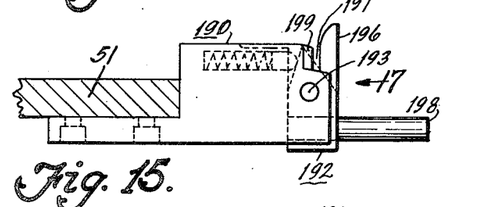
Fig. 15 is a view in the direction of arrow 15 of Fig. 14 with a fragment of dial 51 in section.
Figure 16:
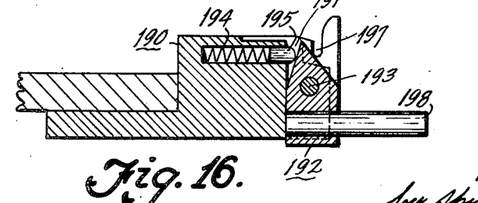
Fig. 16 is a sectional view on line 16—16 of Fig. 14.
Figure 17:
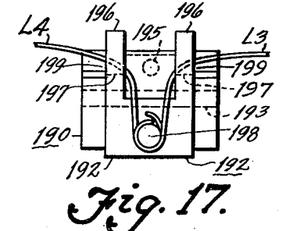
Fig. 17 is a view in the direction of arrow 17 of Fig. 15.

Each of the lead wire holders LC (Figs. 14–17) comprises a bracket 190 attached to the dial 51 and providing a notch 191 which receives a lever 192 pivoted on a pin 193 supported by the bracket 190. A spring 194 urges a plunger 195 to the right (Fig. 16) to maintain the lever 192 normally in the position shown. Lever 192 has arms 196, each of which has a notch 197 which receives one of the lead wires L3 and L4 as shown in Fig. 17, said wires being bent around a rod 198 extending from the lever 192. The arms 196 cooperate as shear blades with shearing edges 199 provided by the bracket 190. As the dial 51 moves counterclockwise, the rods 198 successively engage a cam 200 which effects counterclockwise movement of the levers 192 (as viewed in Figs. 15 and 16) thereby cutting off the excess wire extending from the shearing edges 199.

The dial 51 carries a plurality of cams 201 (Figs. 7 and 8) which successively engage plungers 202 (Figs. 1 and 2) guided for vertical movement by bushings 203 fixed to plate 37. The plungers 202 are connected by a rod 204 with tape dispensing mechanisms not shown which are mounted upon the plate 37. The tape dispensing mechanisms are the subject matter of copending application of E. R. Fausset and W. C. Shaw, Serial No. 125,242, filed March 9, 1949.

Figure 24:
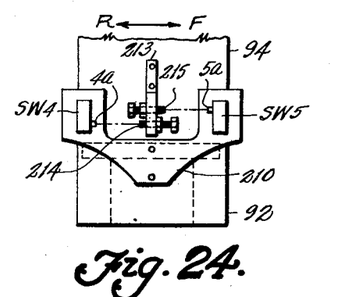
Fig. 24 is an enlargement of a fragment of Fig. 3.

Referring to Figs. 3 and 24, a bracket 210 attached to collar 92 supports a normally closed switch SW4 and a normally open switch SW5 having actuators 4a and 5a engageable respectively by adjustable screws 214 and 215 supported by a bracket 213 attached to hub 94 which supports plates 98 and 99. Since these plates rotate with the dial 51 counterclockwise, motion of bracket 213 in a forward direction is indicated by arrow F in Fig. 24, and in the return direction by arrow R. When the hub 94 is in normal position as shown in Fig. 3, screw 214 engages actuator 4a of switch SW4 to cause it to open. Switch SW5, which is normally open, is closed by movement of its actuator 5a by screw 215 at the end of forward movement of bracket 213.

Figure 25:
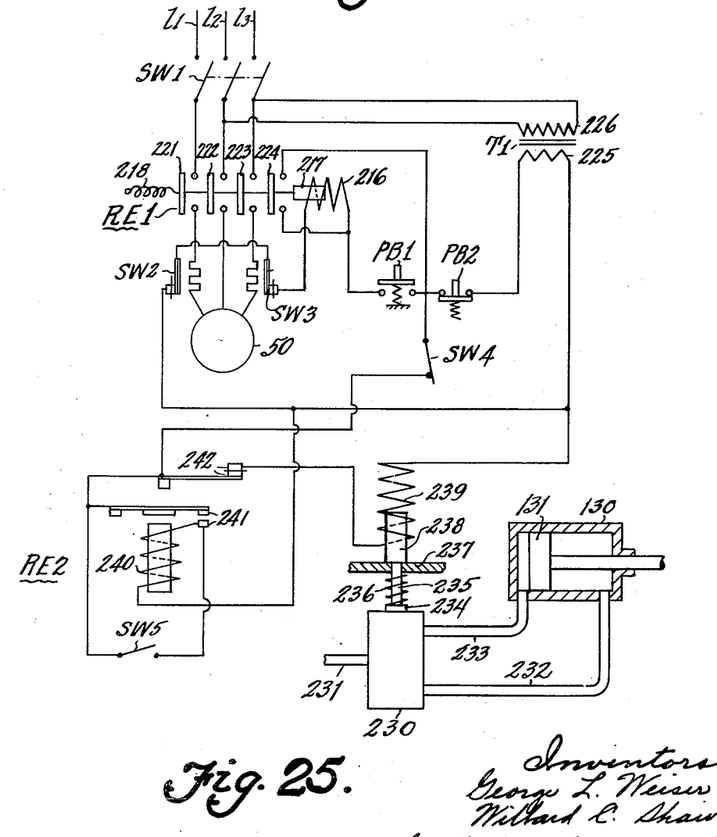
Figure 25 is a wiring diagram of electrical controls of the machine.

Switches SW4 and SW5 are part of an electrical system shown in Fig. 25. By closing switch SW1, 3 phase electrical supply wires 11, 12, 13 are connected with one side of a relay switch RE1 which connects this supply with motor 50 by energization of the coil 216 which effects right movement of an armature 217 against the action of a spring 218 to move contacts 221, 222, 223 and 224 into circuit closing position. By closing push switch PB1, coil 216 receives current from the secondary winding 225 of a transformer T1 whose primary winding 226 is connected with wires 12 and 13 when switch SW1 is closed. Switch PB1 is by-passed by contact 224 when closed. Coil 216, being in series with secondary coil 225 and thermal overload switches SW2 and SW3 and push switch PB2, is open circuited in response to motor overload or to manual opening of switch PB2.

A valve 230 controls the connection of pipe 231 connected with a fluid pressure source either with pipe 232 or with pipe 233 connected with the ends of cylinder 130. Valve 230 has a movable member 234 connected with a rod 235 which extends through a spring 236 and a hole in a fixed plate 237 and is connected with a solenoid armature 238 moved in one direction by a solenoid 239, when energized, and in the opposite direction by the spring 236. As shown, the spring 236 has moved the armature 238 against plate 237 and the member 234 into position causing pressure fluid to flow into the right end of cylinder 130 to effect retraction of the twister.

A relay RE2 has a magnet coil 240, normally open contacts 241 and normally closed contacts 242. When carriage plates 96 and 99 begin moving counterclockwise with the dial 51 (Fig. 1) screw 214 moves away from actuator 4a of switch SW4 and switch SW4 closes and solenoid 239 receives current from transformer secondary coil 225 through switch SW4 and contacts 242 of relay RE2. Valve member 234 moves to connect the left end of cylinder 130 with pipe 231 and the right end with a vent so that the twister is advanced to the crossed lead wires on a holder LT. At the end of counterclockwise movement of plates 96 and 99, switch SW5 is closed by engagement of screw 215 with actuator 5a. Relay coil 240 is energized and contacts 241 engage and contacts 242 disengage. The solenoid 239 is deenergized and the valve member is returned by action of spring 236, in order to effect return of the twister to non-functioning position. Contacts 241, which by-pass switch SW5, provide when closed a current path for coil 240 which remains energized while plates 96 and 99 are returning clockwise to starting position. At the end of return movement, coil 240 is open-circuited by the opening of switch SW4 and contacts 241 separate and contacts 242 engage preparatory to the next cycle.

The machine operates during a cycle of movement of carriage plate 99 upon the leads of three pairs of coils. While leads in the holder LT aligned with the twister when in starting position shown in Fig. 1, twisted leads are in the holder LT ahead of the first mentioned holder in counterclockwise direction of rotation of the conveyor dial 51 and the twisted leads are located at the burner pipe 150, and fused leads are in the holder LT ahead of the second mentioned holder which then has located the fused leads such that they have been bent by the disc 180. Twisting and fusing occurs concurrently as the twister and fuser move with the dial. Since the bender disc 180 moves also with the dial, the bent, fused leads move with disc 180 counterclockwise until carriage plate 99 is released and returns clockwise to starting position. While the plate 99 is moving clockwise, the dial is moving counterclockwise to bring the leads to the twisting, fusing and bending devices preparatory to their counterclockwise movement with the dial. As the leads which have been fused move counterclockwise with the dial, the bending device is moving clockwise to meet the fused leads; and, at the end of clockwise movement of the bending devices, the roller 180 will have received and bent the fused leads.

Figure 26:
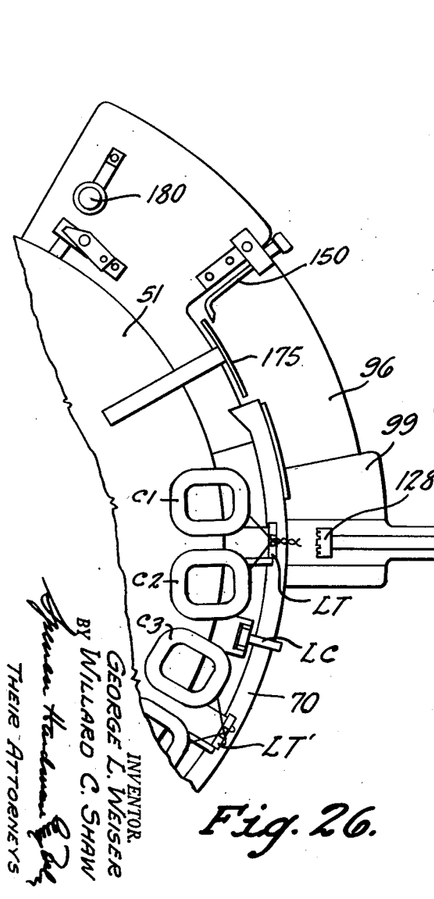
Figures 27, 28:
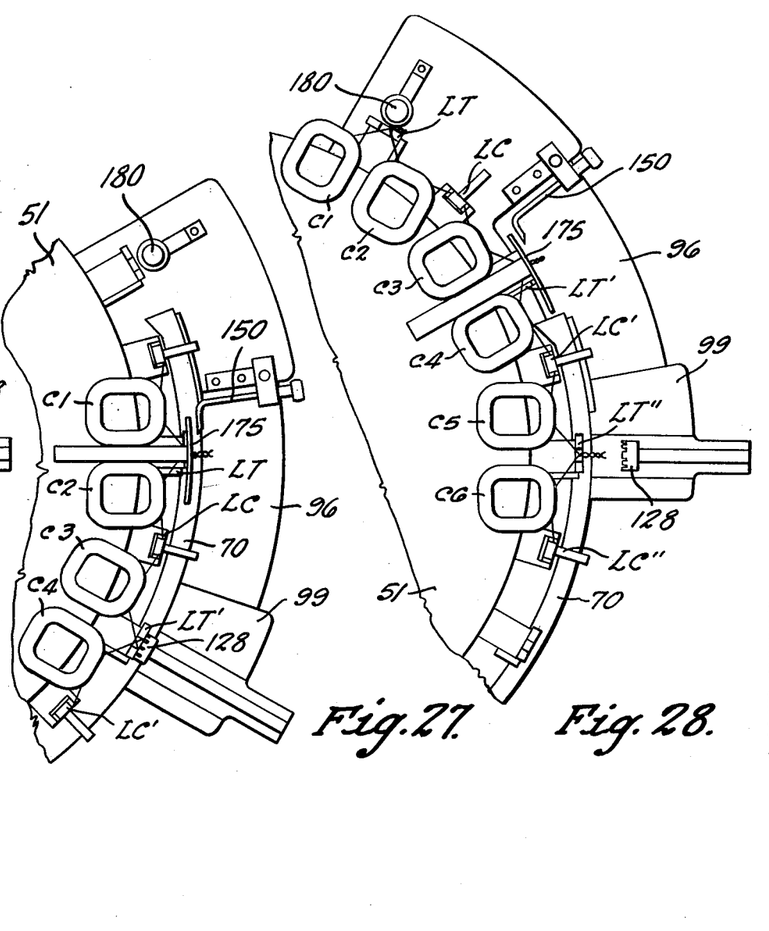

Figs. 26 through 28 show diagrammatically the sequence of operations performed on a single pair of leads from two coils. In Fig. 26, the leads, from a pair of coils C1 and C2, are shown in position within a lead holder LT just after the leads have been twisted by the twisting device 128. This is accomplished by the twister 128 moving in toward the leads, grasping the leads and twisting them as it is retracted as shown in Fig. 26. During this operation, conveyor dial 51 is moving continuously in a counterclockwise position and the carriage plate 99, which carries the twister 128, fuser 150 and bending disc 180, is moving concurrently with the dial 51 in the same direction. As the carriage plate approaches a degree of movement equal to the spacing between various lead holders LT, it is released from connection with the dial, and moves clockwise relative to the dial which continues to move in its same counterclockwise direction until the twister 128 is in position adjacent a second pair of leads from coils C3 and C4 at lead holder LT'. When this position of the carriage plate 99 is obtained, the twisted leads of coils C1 and C2 are adjacent the fuser 150 and again the entire carriage plate 99, with its equipment, moves concurrently with the dial 51 through an angle of movement approximating but slightly less than the distance between the lead holders. During this movement the twister 128 twists the leads at station LT' and the fuser 150 fuses the leads at the holder LT. At this point, the carriage plate 99 is disengaged from the dial 51 and again moves clockwise to a position wherein the twister is adjacent a pair of leads in holder LT''. In this position, the twister 128 twists the leads at LT'', the fuser 150 fuses the twisted leads at holder LT' and the bending disc 180 is in a position to bend the leads at holder LT when the carriage plate 99 is released to move rearwardly to pick up its next position adjacent another lead holder.

Thus it is apparent that the carriage plate, with its equipment, moves approximately 30° counterclockwise with the dial and then is retracted in a clockwise position to pick up another set of leads. The concurrent movement with the dial in each instance is of such length to accomplish the twisting and fusing operation on leads at adjacent lead holders. This provides a step-by-step operation with respect to the carriage plate wherein at each movement of the carriage plate, three sets of leads have each been caused to pass through one operation wherein each successive operation is advanced one from the preceding step whereby a pair of leads are twisted, fused and bent upon three successive retractions of the carriage plate 99 and wherein another set of leads have been twisted and fused while a third set of leads have merely been twisted. In this manner, the carriage plate reciprocates within approximately a 30° arc, performing operations simultaneously on three sets of leads while the conveyor dial 51 moves continuously at a given rate in a counterclockwise direction.

While the embodiment of the present invention as herein disclosed, constitutes a preferred form, it is to be understood that other forms might be adopted.

What is claimed is as follows:

1. In a machine for connecting lead wire of a pair of electrical coils, the combination comprising a conveyor, means for continuously moving the conveyor, a plurality of pairs of equally spaced coil holders mounted on the conveyor, each pair for receiving a pair of coils having lead wires to be joined, a plurality of lead wire holders mounted on the conveyor each associated with a pair of coil holders and each having means for retaining in cross relation lead wires of a pair of coils to be electrically connected, a carriage connected for movement with the conveyor and holders, means for causing the carriage to move with the conveyor from a certain starting position, means for automatically releasing the carriage from the conveyor after the carriage has moved with the conveyor a distance less than the spacing of the lead wire holders, means for returning the carriage to said starting position while the conveyor moves ahead, a lead twister supported by the carriage in a position adjacent to a lead holder retaining untwisted leads when the carriage begins movement with the conveyor, and means for causing operation of the twister to twist the leads retained by said lead holder only in response to movement of the carriage with the conveyor.

2. The combination according to claim 1 further characterized by a lead twister which includes a rotary and axially movable member providing a notched annular flange, means for advancing the member into engagement with the lead wires preparatory to twisting them and for retracting the member after twisting, control apparatus for the last named means rendered operative to effect advancement of the member after the start of movement of the carriage with the conveyor and to effect retraction of the member upon completion of movement of the carriage with the conveyor and means for causing rotation of the member in response to movement of the carriage.

3. The combination according to claim 1 further characterized by a lead wire holder providing a plate having a notch which receives the lead wires which are crossed at the notch, providing a block which urges the leads toward the back of the plate and which has a lug which closes the notch to confine the lead wires therein, means for advancing the block toward the plate during movement of the carriage with the conveyor, means for retracting the block after completion of movement of the carriage with the conveyor, and further characterized by a lead twister which is advanced toward the front of the plate and into engagement with the leads preparatory to the twisting operation.

4. The combination according to claim 1 further characterized by a lead wire holder providing a plate having a notch which receives the lead wires which are crossed at the notch, providing a block which urges the leads toward the back of the plate and which has a lug which closes the notch to confine the lead wires therein, a cam follower connected to the block, a relatively fixed cam engaged by the cam follower during movement of the carriage with the conveyor to cause the block to move toward the plate, a spring urging the cam into functioning position whereby the block is urged against the lead wires with yielding pressure, and further characterized by means for advancing the twister toward the front of the plate and into engagement with the lead wires with yielding pressure preparatory to the twisting operation.

5. In a machine for connecting lead wires of pairs of electrical coils, the combination including a conveyor, means for continuously moving the conveyor, a plurality of equally spaced coil holders mounted on the conveyor, each adapted to receive a coil, lead wire holders mounted on the conveyor and each located for reception of lead wires of coils on two adjacent coil holders, and each having means for supporting in crossed relation, the lead wires of a pair of coils to be electrically connected, a rotatable and axially movable lead wire twister adjacent the conveyor and the lead wire holder supporting crossed lead wires, means effective, after the conveyor has thus located the lead wire holder, for causing the twister to move bodily with the conveyor a distance less than the spacing of the several lead wire holders, means for returning the twister to starting position following said movement with the conveyor, means for causing the twister to advance into engagement with the crossed lead wires during the first part of movement of the twister with the conveyor and to retract at the end of said movement, and means for causing rotation of the twister.

6. In a machine for connecting lead wires of pairs of electrical coils, the combination including a conveyor dial, means for continuously rotating the dial, a plurality of equally spaced coil holders mounted on the dial, each adapted to receive a coil, a plurality of equally spaced lead wire holders mounted on the dial and each located between a pair of coil holders for reception of lead wires of coils on adjacent coil holders and each having means for supporting, in crossed relation, the lead wires of a pair of coils to be electrically connected, a carriage plate mounted for rotation coaxially of the dial, a lead wire twister supported by the plate for rotation on an axis extending radially of the axis of the plate and for axial movement in a radial direction toward and from the dial, spring means for yieldingly maintaining the plate in certain starting position, a mechanism which is effective, when the dial has brought a lead wire holder adjacent to the twister, for causing the carriage plate to rotate with the dial an angular distance less than the angular spacing of the lead wire holders, said mechanism being adapted to release the carriage plate from the dial whereby the spring means returns the plate to said starting position, means for causing the twister to advance axially to the crossed lead wires during the first part of movement of the carriage plate with the conveyor and to retract at the end of said movement, and means for causing rotation of the twister in response to movement of the carriage plate with the conveyor.

7. In a machine for connecting lead wires of electrical coils, the combination including a conveyor, means for continuously moving the conveyor, a plurality of equally spaced coil holders mounted on the conveyor, each adapted to receive a coil, a plurality of equally spaced lead wire holders mounted on the conveyor and each located for reception of lead wires of coils on two adjacent coil holders, and each having means for supporting in crossed relation, the lead wires of a pair of coils to be electrically connected, a lead wire twister, to which the conveyor brings the lead wire holder supporting crossed lead wires, a carriage supporting the twister and supported for movement with the conveyor, a mechanism for transmitting motion from the conveyor to the carriage for a certain distance of conveyor movement then releasing the carriage from connection with the conveyor, said mechanism comprising a plural-arm element rotatably supported by the carriage, abutments carried by the conveyor and successively engageable with an arm of said element, and a fixed plate engaged by another arm of said element to prevent rotation thereof until after said other arm has been moved by the conveyor past the fixed plate, and means for returning the carriage to its starting position to cause the element to return to normal position relative to the fixed plate.

8. A machine for sequentially twisting, fusing and bending lead wires of a plurality of pairs of electrical coils, comprising in combination; a conveyor, means for continuously moving the conveyor in one direction, a plurality of pairs of coil holders moved by the conveyor, each pair of holders being adapted to receive a pair of coils having lead wires to be joined, a plurality of lead wire holders moved by the conveyor, one of which is associated with each pair of coil holders, a tool carriage associated with the conveyor and movable therewith in said one direction from a starting position to a position approximating but less than the distance between said holders and then retractable in the opposite direction to said starting position, while said conveyor continues to move in said one direction, said tool carriage, while moving with said conveyor, being disposed adjacent three lead wire holders, a twisting mechanism carried by the tool carriage, a fusing device carried by the tool carriage and a bending device carried by the tool carriage, said twisting mechanism and fusing device being simultaneously operable during carriage movement with the conveyor for twisting a pair of leads at one lead holder and for fusing a pair of leads at the next adjacent lead holder and said bending device being operable upon retraction of the carriage for bending the leads at a third holder whereby upon each retraction of the tool holder, one completed twisted, fused and bent pair of lead wires are discharged from the carriage and a new pair of lead wires are brought into alignment with the carriage.

9. A machine for sequentially performing a plurality of functions upon pairs of lead wires to be formed from a plurality of pairs of electrical coils, comprising in combination; a conveyor continuously movable in one direction and coil holders on said conveyor for holding coils and having lead holders interposed between said coil holders for holding pairs of leads to be operated upon, a tool carriage movable with said conveyor through a distance less than the distance between the lead holders and retractable a similar distance in a direction opposite to the direction of movement of said conveyor during continued movement of said conveyor, a plurality of tools for performing functions on the pairs of coil leads carried by said conveyor and simultaneously operable when the carriage is moved concurrently with the conveyor for performing separate functions upon a plurality of pairs of leads, and another tool for performing another function upon retraction of said carriage, said tools being simultaneously movable during retraction of the carriage so that said same operations are performed on different pairs of leads whereby the conveyor moves continuously and the carriage performs a step-by-step movement in a predetermined range for performing a plurality of functions upon pairs of leads passing thereby.

References Cited in the file of this patent

UNITED STATES PATENTS

| Number | Name | Date |
|---|---|---|
| 1,071,121 | Weber | Aug. 26, 1913 |
| 1,288,402 | Gale | Dec. 17, 1918 |
| 1,913,904 | Segur | June 13, 1933 |
| 1,920,630 | Conn | Aug. 1, 1933 |
| 2,028,225 | Larson | Jan. 21, 1936 |
| 2,093,173 | Olson | Sept. 14, 1937 |
| 2,244,554 | Hannaford | June 3, 1941 |
| 2,416,672 | Archer | Mar. 4, 1947 |
| 2,443,564 | Kunkle et al. | June 15, 1948 |
| 2,492,228 | Lee et al. | Dec. 27, 1949 |